United States Patent [19]

Hileman et al.

[11] Patent Number: 5,305,380
[45] Date of Patent: Apr. 19, 1994

[54] METHODS AND APPARATUS FOR PROVIDING A SECURE TELECOMMUNICATIONS PORT

[75] Inventors: Vincent Hileman, San Jose; Clifford Willis, Tracy; David Evans; Benjamin Stolz, both of Mountain View, all of Calif.

[73] Assignee: Sun Microsystems, Inc., Mountain View, Calif.

[21] Appl. No.: 886,071

[22] Filed: May 20, 1992

[51] Int. Cl.5 .................... H04M 1/00; H01R 13/44
[52] U.S. Cl. .................................. 379/445; 439/133
[58] Field of Search .............. 439/299, 133, 304, 305, 439/307, 650, 651, 676; 379/445, 437, 438, 442

[56] References Cited

U.S. PATENT DOCUMENTS

| | | | |
|---|---|---|---|
| 4,311,883 | 1/1982 | Kidney | 379/445 |
| 4,846,708 | 7/1989 | Marson et al. | 439/133 |
| 4,893,488 | 1/1990 | Klein | 439/133 |
| 4,964,284 | 10/1990 | McDaid | 439/133 |

Primary Examiner—James L. Dwyer
Assistant Examiner—Jack Chiang
Attorney, Agent, or Firm—Blakely Sokoloff Taylor & Zafman

[57] ABSTRACT

A device for preventing unauthorized access to female modular telephone jacks. A physical plug has been designed such that when it is inserted into an RJ-11, RJ-14, or RJ-45 modular telephone jack, it locks into place and cannot be removed without the use of a specialized tool. The specialized tool then acts as a key to unlock the plug. Several different pairs of plugs and corresponding tools have been created such that there are different 'locks' and 'keys'.

9 Claims, 4 Drawing Sheets

FIG_1
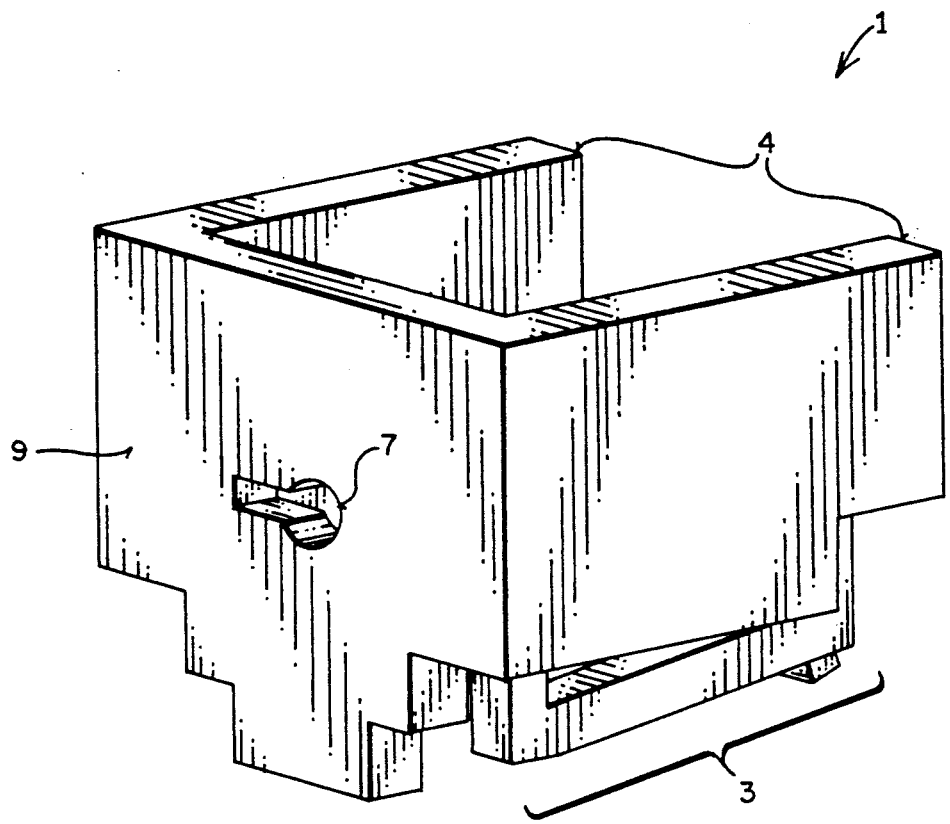
FIG_2
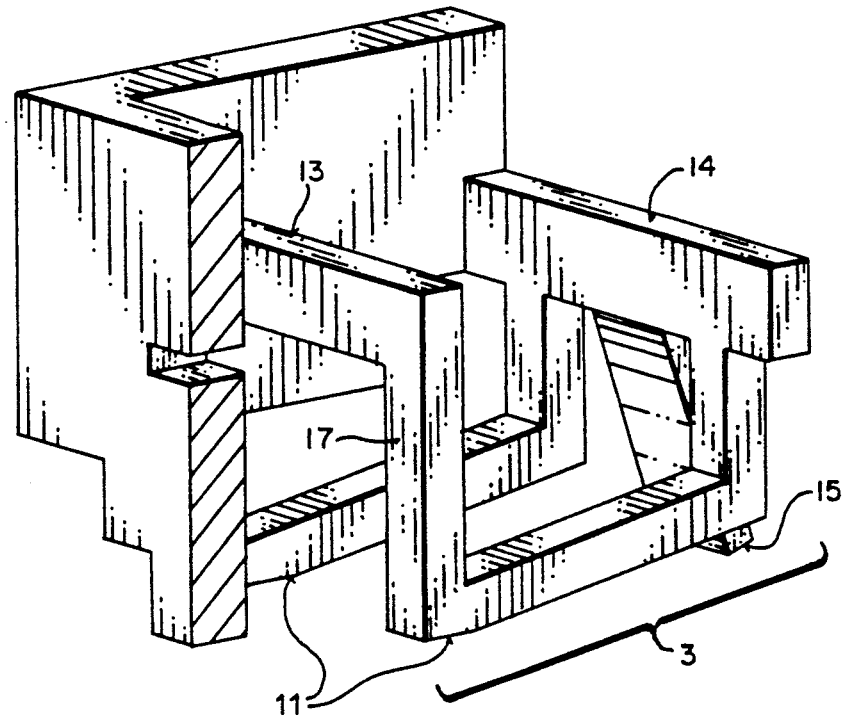

FIG_3A
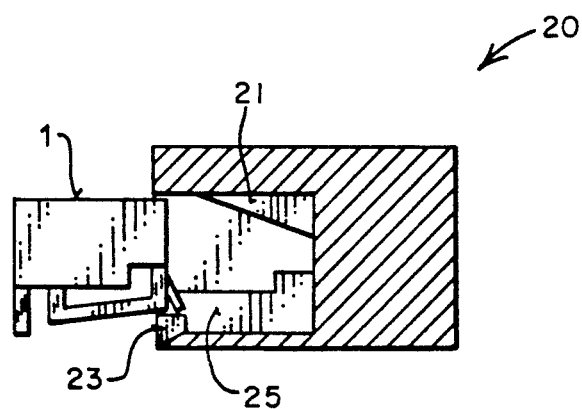
FIG_3B
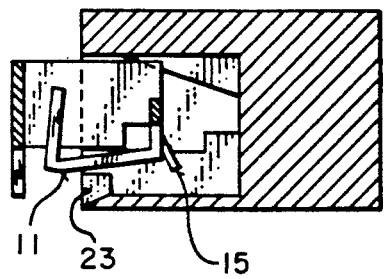
FIG_3C
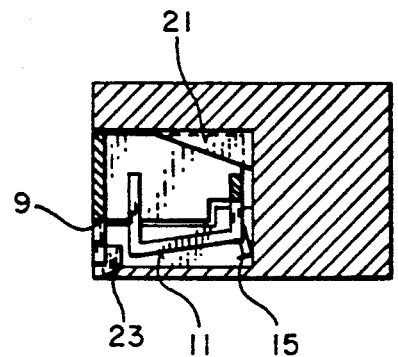

FIG_4A
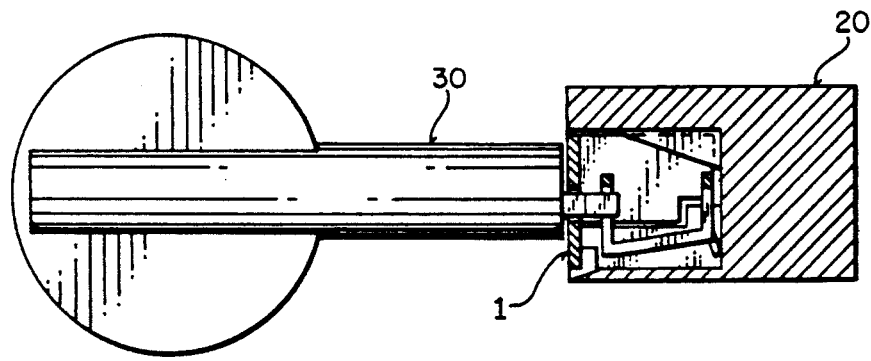
FIG_4B
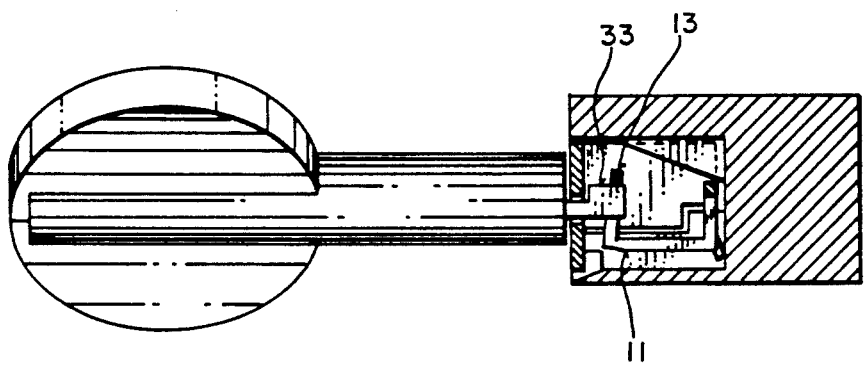
FIG_4C
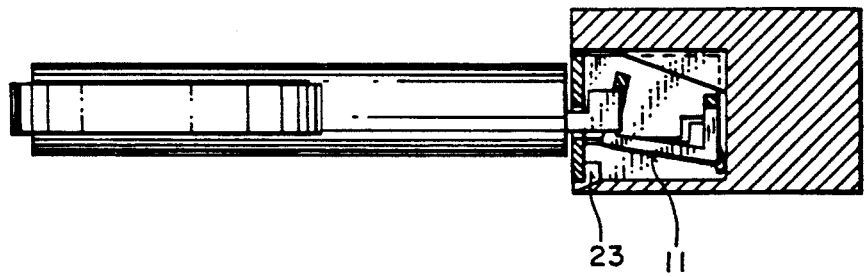
FIG_4D
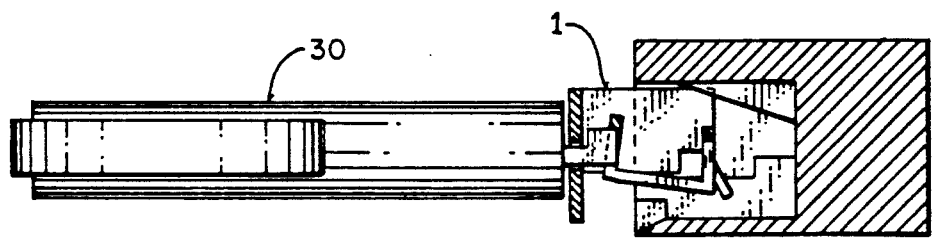

FIG_5
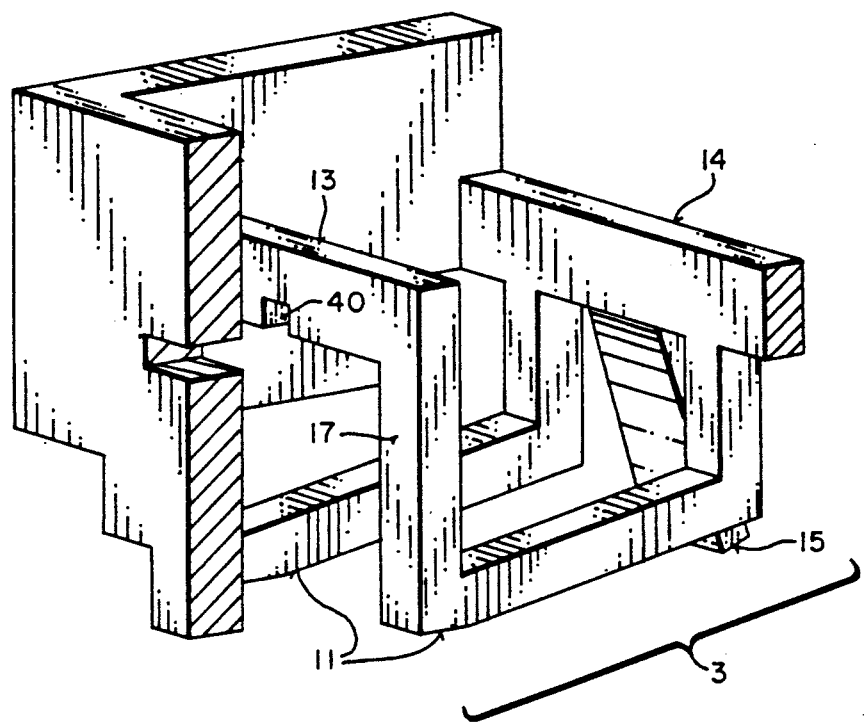
FIG_6
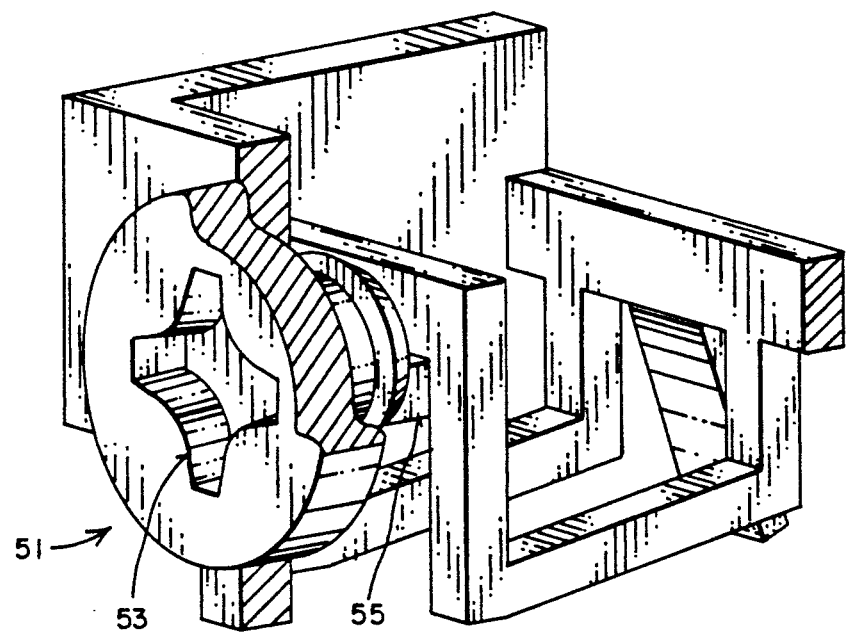

METHODS AND APPARATUS FOR PROVIDING A SECURE TELECOMMUNICATIONS PORT

BACKGROUND OF THE INVENTION

1. Field of the Invention

This invention relates to a telecommunications security device. More particularly, to an secure plug designed to prevent the unauthorized use of a female modular telephone receptacle.

2. Art Background

Ordinary telephones are connected to the telephone network system through the use of a standardized modular connector called an RJ-11, RJ-14 or RJ-45 connector. The modular connectors have different designations depending on the number of electrical contacts within the connector. RJ-11 connectors typically have four electrical contacts and RJ-45 connectors typically have eight electrical contacts. Hereafter, all modular telephone connectors will be referred to generically as RJ-xx connectors.

The telephone network system uses "female" RJ-xx receptacles as ports which are used to connect telephones to the network. Each ordinary telephone also has a female RJ-xx receptacle. The telephones are connected to the telephone network using a wire which has a "male" RJ-xx jack located at each end. The use of modular RJ-xx connectors allows telephones to easily be connected to and disconnected from the telephone network system by users without tools of any kind.

The same RJ-xx modular connector used to connect telephones to the telephone network system is also used to connect most other telecommunication devices such as computer modems, fax machines, answering machines, etc. to the telephone network system. Each of these devices has a female RJ-xx receptacle which accepts the same wire having a male RJ-xx jack located on each end.

At times it is desirable to restrict access to female RJ-xx receptacles in order to protect the inner circuitry from outside elements such as moisture or dust which may cause harm. This can be accomplished very simply by plugging up the female RJ-xx receptacles with a "dummy" male plug or covering the receptacle with tape.

Another reason to cover up a female RJ-xx receptacle is to prevent the unauthorized use of the receptacle. This is accomplished by the present invention which comprises a specialized secure plug which is inserted into a female RJ-xx receptacle and cannot be removed by ordinary means.

One application of such a device is to limit the access to a "live" telephone line. For example, a landlord may desire to rent out a piece of property for a short term without allowing the lessee to use any telephone service which may be installed on the property. The landlord in such a situation could install the present invention into each of the the modular telephone connectors located on the property which provide telephone service to the property. In this manner the lessee will not be able to access the telephone service and make unauthorized long-distance telephone calls.

Another possible application of the present invention is to prevent the access to a female RJ-xx receptacle on a telecommunications device such as a telephone, modem, fax machine, or any other device that uses a female RJ-xx receptacle. For example, a manufacturer may produce a product that provides telecommunication capabilities which are not yet approved for use by the local telephone regulatory agency. In such a situation, the manufacturer could plug the female RJ-xx receptacle with the disclosed device and thereby prevent the use of the telecommunication capabilities on the product until it is approved for use. When the local telephone regulatory agency approves of the device, the plug could be removed using a specialized tool.

SUMMARY OF THE INVENTION

It is therefore the object of the present invention to provide an apparatus for preventing the unauthorized use of a female RJ-xx receptacle. Unauthorized use is prevented by physically blocking access to the female RJ-xx receptacle with a specialized locking plug.

It is a further object of the present invention to allow access to the female RJ-xx receptacle when authorized through the use of a specialized tool. The specialized tool acts as a 'key' to 'unlock' the plug and remove it from the female RJ-xx receptacle.

It is yet a further objective of the present invention to have several different shaped plug and corresponding tool sets such that there are different 'locks' that require different 'keys' to unlock them.

A final objective of the present invention is to create plug and corresponding tool set such that the tool and plug remain permanently connected when the plug is removed.

All of the above objectives have been achieved in the secure male plug as disclosed. A male plug is formed and dimensioned for insertion into a standard RJ-xx female receptacle. The male plug has a generally continuous front panel having a small centrally located keyhole opening. Internally, the male plug has a pair of longitudinally extending parallel rails mounted to a crossbar extending between both lateral sides at the rear of the plug. Both parallel rails further have integrally formed vertically rising members which are joined to a common crossbar lifting surface. In order to remove the male plug, a key is inserted into the keyhole and rotated such that the blade of the key deflects the crossbar lifting surface vertically, thereby raising the parallel rails up out of a complementary depression formed in the female receptacle housing. The engaged key and plug may then be extracted from the female RJ-xx receptacle. In one embodiment, the plug is permanently retained on the key by cooperatively acting locking surfaces between the key and the plug.

BRIEF DESCRIPTION OF THE DRAWINGS

FIG. 1 is a perspective view of the secure plug.

FIG. 2 is a cut-away perspective view of the secure plug revealing the inner locking mechanism.

FIGS. 3(A)–3(C) give a step-by-step illustration of the secure plug being inserted into a female RJ-xx receptacle.

FIGS. 4(A)–4(D) give a step-by-step illustration of the secure plug being removed from a female RJ-xx receptacle using a matching key.

FIG. 5 is a cut-away perspective view of an embodiment of the secure plug in which the inner locking mechanism permanently couples to the key such that the key may only be used once.

FIG. 6 is a perspective view of an alternate embodiment of the plug.

DETAILED DESCRIPTION OF THE INVENTION

A secure telecommunications plug is disclosed. In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

Referring to FIG. 1, the present invention consists of a plug 1 designed to fit within a standardized female modular telephone receptacle such as an RJ-11, RJ-14, or RJ-45 receptacle. (Hereafter such receptacles will be referred to generically as an RJ-xx receptacle.) Plug 1 has a front face 9 shaped such that it substantially fills the opening and is flush with the exterior front surface of the RJ-xx receptacle. On the surface of face 9 is a keyhole opening for inserting a "key" which removes the plug 1 from a RJ-xx receptacle. A pair of parallel side walls 4 extend rearward from the face 9 and are connected together at the rear by a rear support. (Not shown) The rear support is located near the bottom of the side walls 4 such that an opening exists at the rear of the plug. The opening is large enough such that the plug 1 will not touch the electrical wire contacts on the upper surface of the female RJ-xx receptacle, and thus will not be harm the wire contacts. Within plug 1 is an engaging mechanism 3 which is used to lock the plug into the female RJ-xx receptacle.

Referring now to FIG. 2, the inner mechanisms of the present invention are displayed using a cut-away view. The engaging mechanism 3 is constructed of two longitudinally extending parallel rails 11 extending from the rear support 14. The parallel rails 11 flex upwards while being inserted into a female RJ-xx receptacle and lock down when fully inserted into the receptacle. Tab spring 15 also extends from the rear support 14 of plug 1 for holding the plug firmly within the female RJ-xx receptacle. Tab spring 15 also facilitates in the removal of the plug since it pushes the plug outward. In order for parallel rails 11 and tab spring 15 to flex properly, plug 1 is constructed using any appropriate electrically insulating yet flexible material such as ABS. The parallel rails 11 each have vertical members 17 which are connected at the top by a crossbar 13. Crossbar 13 is used to lift up the parallel rails 11 in order to remove the plug 1 after it has been inserted into a female RJ-xx receptacle.

Referring to FIGS. 3(A)-3(C), the insertion of the secure plug 1 into a female RJ-xx receptacle 20 having an opening 25, wire contacts 21, and retaining ledge 23 is shown. In FIG. 3(A), a plug 1 is being to be inserted into the opening 25 of a female RJ-xx receptacle 20. In FIG. 3(B) the parallel rails 11 of plug 1 are being deflected upwards by retaining ledge 23 as the plug is being inserted so that the plug will fit into opening 25. Finally, FIG. 3(C) illustrates the plug 1 fully inserted and locked into the female RJ-xx receptacle 20 with face 9 flush with the exterior surface of opening 25. In FIG. 3(C), the parallel rails 11 have snapped back down and are now engaged by retaining ledge 23 of the female receptacle 20. The parallel rails 11 are firmly pressed against retaining ledge 23 by the outward horizontal force exerted by tab spring 15. While the secure plug 1 remains within the female RJ-xx receptacle 20, the wire contacts 21 are not touched since they fit between parallel walls 4 (Shown in FIG. 1) of the secure plug 1.

Referring to FIGS. 4(A)-4(D), the removal of a secure plug 1 from a female RJ-xx receptacle 20 is shown. FIG. 4(A) illustrates a "key" 30 inserted into the keyhole 7 (Shown in FIG. 1) of the plug 1. As key 30 is rotated as shown in FIG. 4(B), the blade 33 of the key lifts up crossbar 13 and thus also parallel rails 11 which are each connected to crossbar 13 by vertical members 17. In FIG. 4(C), the key 30 has been rotated 90 degrees lifting the parallel rails 11 high enough to clear the retaining ledge 23. Finally in FIG. 4(D), the key 30 is pulled outwards extracting the plug 1 from opening 25 of the female RJ-xx receptacle 20.

FIG. 5 discloses an embodiment of the secure plug in which after removal from RJ-xx receptacle, the plug remains permanently connected to the key used to remove the plug. Referring to FIG. 5, crossbar 13 has a notch 40 which cooperatively latches to the blade of the key used to remove the plug. Referring to FIG. 4(C), once the key 30 has been rotated 90 degrees, the crossbar 13 would snap partially back down with the blade of key 30 locked within the notch. (Not shown)

FIG. 6 discloses an alternate embodiment of the plug for use in situation where security is not required. In FIG. 6, the keyhole has been replaced with a rotatable cam 51. The face of the rotatable cam 51 has an indented star pattern 53 which is used to insert a Phillips screwdriver to rotate the cam 51. The cam has a blade 55 which is used to lift the crossbar 13.

The foregoing has described a secure telecommunications plug. It is contemplated that changes and modifications may be made by one of ordinary skill in the art, to the materials and arrangements of elements of the present invention without departing from the spirit and scope of the invention.

We claim:

1. A security device for preventing unauthorized access to a telecommunications port having a plurality of electrical contacts, said device comprising:
   a housing for enclosing said telecommunications port, said housing having a rear wall and a retaining ledge in said housing;
   a plug for filling said housing such that the plug locks into said telecommunications port housing, said plug comprising:
      a body, said body having an opening such that said plurality of electrical contacts do not contact said body;
      a face on said body, said face shaped such that said plug substantially covers said housing, said face having a keyhole opening; and
      an engaging mechanism coupled to said body for engaging said retaining ledge of said housing, said engaging mechanism having:
         a pair of parallel rails constructed such that said parallel rails flex while being inserted into said housing and snap into place engaging said retaining ledge when fully inserted; and
         a rear member joining said pair of parallel rails, said parallel rails extending forward from said rear member:
         a crossbar coupled to said parallel rails by a pair of vertical standoffs, said crossbar located such that said parallel rails disengage said retaining ledge when said crossbar is lifted;

a tab spring extending rearward from said rear member, said tab spring pushing against said rear wall so as to push said parallel rails against said retaining ledge when said parallel rails are fully inserted into said housing; and a key for removing said plug from said housing, said key shaped to fit within said keyhole opening on said plug face and disengage said engaging mechanism.

2. The security device as set forth in claim 1 wherein said telecommunications port comprises an RJ-45 telephone jack.

3. The security device as set forth in claim 1 wherein said telecommunications port comprises an RJ-11 telephone jack.

4. A secure plug for preventing the unauthorized use of a telecommunications port, said plug comprising:

a face shaped such that said plug substantially covers said telecommunications port;

a pair of parallel side walls extending rearward from said face;

a rear member, said rear member joining said pair of parallel side walls;

an engaging mechanism coupled to said rear member for engaging said telecommunications port and retaining said plug within said port, said engaging mechanism having:

a pair of parallel rails extending forward from said rear member and constructed such that said parallel rails flex while being inserted into said telecommunications port and snap into place engaging a retaining ledge within said telecommunications port when fully inserted;

a crossbar coupled to each of said parallel rails by a pair of vertical standoffs, said crossbar having a lifting surface which, when lifted, disengages said parallel rails from said retaining ledge; and a tab spring extending rearward from said rear member, said tab spring pushing against a rear wall of said telecommunications port so as to push said parallel rails against said retaining ledge when said parallel rails are fully inserted into said telecommunications port.

5. The secure plug as claimed in claim 4 wherein said plug has a keyhole located on said face.

6. The secure plug as claimed in claim 5 further comprising a key shaped to fit within said keyhole, said key having a blade which contacts and lifts said crossbar within said plug such that said parallel rails are disengaged from said retaining ledge.

7. The security device as set forth in claim 4 wherein said telecommunications port comprises an RJ-45 telephone jack.

8. The security device as set forth in claim 4 wherein said telecommunications port comprises an RJ-11 telephone jack.

9. A method of preventing unauthorized access to a telecommunications port, said method comprising the steps of:

providing a housing for enclosing said telecommunications port, said housing including a retaining ledge;

plugging said housing with a plug shaped to fit within said housing, said plug having a keyhole and a crossbar coupled to a pair of parallel rails by a pair of vertical standoffs, wherein said parallel rails engage said retaining ledge when said plug is inserted into said telecommunications port housing, said plug further having a rear member rearward from which extends a tab spring, said tab spring pushing against a rear wall of said telecommunications port so as to push said parallel rails against said retaining ledge when said parallel rails are fully inserted into said telecommunications port; and removing said plug with a key, said key being inserted into said keyhole and rotated such that said crossbar is lifted disengaging said parallel rails from said retaining ledge.

* * * * *